United States Patent
Buelow, II et al.

(10) Patent No.: US 6,942,373 B2
(45) Date of Patent: Sep. 13, 2005

(54) FIBEROPTIC LIGHTING SYSTEM WITH SHAPED COLLECTOR FOR EFFICIENCY

(75) Inventors: Roger F. Buelow, II, Gates Mills, OH (US); John M. Davenport, Middleburg Heights, OH (US); Gregory P. Frankiewicz, University Heights, OH (US); Dave Bina, Northfield Center, OH (US)

(73) Assignee: Fiberstars Incorporated, Fremont, CA (US)

( * ) Notice: Subject to any disclaimer, the term of this patent is extended or adjusted under 35 U.S.C. 154(b) by 19 days.

(21) Appl. No.: 10/794,624

(22) Filed: Mar. 5, 2004

(65) Prior Publication Data

US 2004/0179349 A1 Sep. 16, 2004

Related U.S. Application Data

(60) Provisional application No. 60/454,816, filed on Mar. 14, 2003.

(51) Int. Cl.[7] ............................................. F21V 7/04
(52) U.S. Cl. ........................ 362/581; 362/554; 362/558; 385/133; 385/31
(58) Field of Search ................................ 362/551, 554, 362/556, 558, 581, 298, 299, 302, 304; 385/133, 146, 147, 31–34, 39, 43, 70, 88, 115–117, 121

(56) References Cited

U.S. PATENT DOCUMENTS

| | | | | | |
|---|---|---|---|---|---|
| 4,795,227 | A | * | 1/1989 | Chande | 385/33 |
| 5,058,985 | A | * | 10/1991 | Davenport et al. | 385/115 |
| 5,199,091 | A | * | 3/1993 | Davenport et al. | 385/39 |
| 5,396,571 | A | * | 3/1995 | Saadatmanesh et al. | 385/33 |
| 5,559,911 | A | * | 9/1996 | Forkner et al. | 385/33 |
| 5,675,677 | A | * | 10/1997 | Davenport et al. | 385/31 |
| 6,304,693 | B1 | | 10/2001 | Buelow, II et al. | |

* cited by examiner

Primary Examiner—Stephen Husar
Assistant Examiner—Hargobind S. Sawhney
(74) Attorney, Agent, or Firm—Charles E. Bruzga; Bruzga & Associates

(57) ABSTRACT

A fiberoptic lighting system has a light source with a bulbous section and a plurality of plastic light pipes having substantially circular cross sections. A collector has an inlet for receiving light from the light source and an outlet. The collector performs an area-to-angle conversion on light it collects from the light source. A plurality of rods receives light from the collector and passes such light to the plastic light pipes, while thermally isolating the plastic light pipes from the light source. A perimeter of an outlet of the collector has a plurality of shaped portions, each associated with, and each substantially shaped the same as, a substantial portion of an associated perimeter of a respective one of the plurality of rods. The foregoing system delivers a higher percentage of light from a light source into multiple light pipes than in a prior art system.

41 Claims, 16 Drawing Sheets

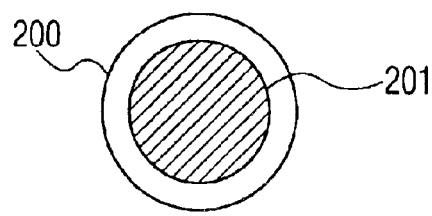
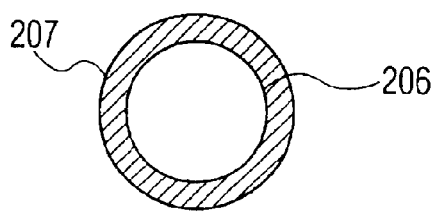
FIG. 16a
FIG. 16b
FIG. 17
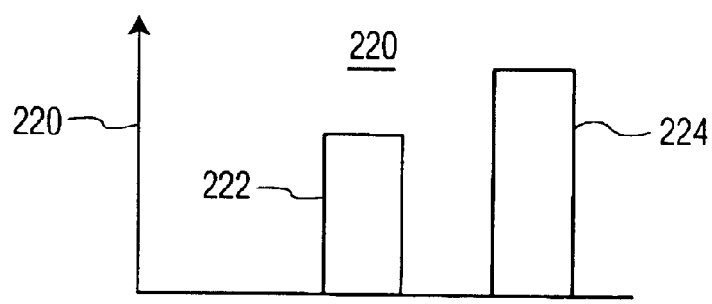
FIG. 18

FIBEROPTIC LIGHTING SYSTEM WITH SHAPED COLLECTOR FOR EFFICIENCY

This application claims priority from U.S. Provisional Patent Application No. 60/454,816 filed Mar. 14, 2003.

FIELD OF THE INVENTION

The invention relates to a fiberoptic lighting system having a collector of light shaped to efficiently transfer light to multiple, discrete collecting rods. More particularly, the invention relates to such a system in which the collector of light performs an angle-to-area conversion of light it collects from a light source.

BACKGROUND OF THE INVENTION

U.S. Pat. No. 6,304,693 issued Oct. 16, 2001 for Efficient Arrangement for Coupling Light from a Light Source to a Light Guide discloses a fiberoptic illumination system that efficiently couples light from a light source into a light pipe, or plurality of light pipes. The system may use a metal halide light source, a light collector comprising a coated hollow angle-to-area converter, and a single, coated quartz rod. The output of the preferred embodiment of this converter is not a circle, but two joined sections of a circle. Because of this, when a rod with a circular cross-section of equal or smaller area is placed in front of the light collector to couple light to the light pipes, not all of the light is collected. Only about 90% of the light is collected and delivered to one or more light pipes.

The single rod of the mentioned, prior art system has an output surface with a substantially even amount of illumination across its face, to allow a substantially equal amount of light to be delivered into each of several light pipes. The single rod has ultraviolet energy (UV) and infrared light (IR) filters on at least its input end to protect the light pipes, which are often made of plastic, and the rod thermally isolates the light pipe or pipes from the heat of the light source.

A disadvantage to using a single rod with a bundle of light pipes is that there are light losses due to the interstitial voids created at the interface of coupling multiple round light pipes to a single round rod. The present inventors have determined that the losses vary as the number of light pipes increase, but for four round light pipes of the same diameter, a maximum collection efficiency of typically about 72% is realized, for an overall efficiency of typically about 65% of collected light delivered into the light pipes.

It would thus be desirable to provide a fiberoptic illumination system that delivers a higher percentage of light from a light source into multiple light pipes.

SUMMARY OF THE INVENTION

A preferred form of the invention provides a fiberoptic lighting system, having a light source with a bulbous section and a plurality of plastic light pipes having substantially circular cross sections. A collector has an inlet for receiving light from the light source and an outlet. The collector performs an area-to-angle conversion on light it collects from the light source. A plurality of rods receives light from the collector and passes such light to the plastic light pipes, while thermally isolating the plastic light pipes from the light source. A perimeter of an outlet of the collector has a plurality of shaped portions, each associated with, and each substantially shaped the same as, a substantial portion of an associated perimeter of a respective one of the plurality of rods.

The foregoing system, and further forms of the invention, deliver a higher percentage of light from a light source into multiple light pipes than in the above-discussed prior art system.

BRIEF DESCRIPTION OF THE DRAWINGS

In the drawing figures, like reference numerals refer to like parts.

FIGS. 16a and 16b are simplified views of output areas of rods and associated input areas of the light-carrying portions of light pipes, shown cross hatched for clarity.

FIG. 17 is a side plan view of a light-collecting rod with optical coating(s) that may be used in the inventive light-collection system.

FIG. 18 is a bar chart comparing the outlet area of a rod used in an inventive system to the inlet area of the rod.

DETAILED DESCRIPTION OF THE INVENTION

Figure 1A:
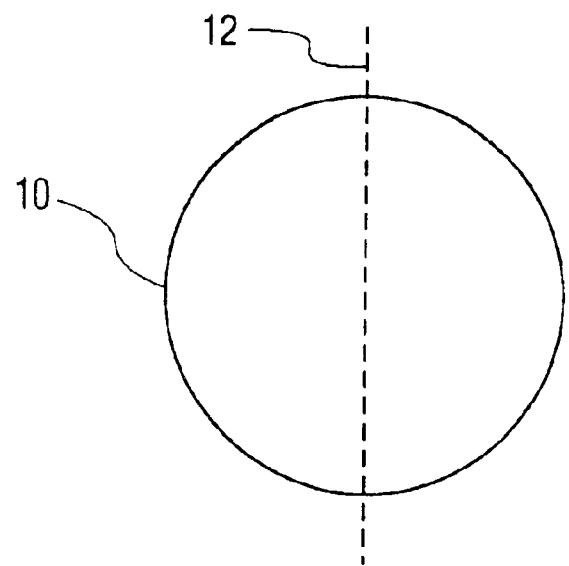
FIG. 1a is a view of a circle used for designing an output shape of a non-imaging collector of the prior art.
Figure 1B:
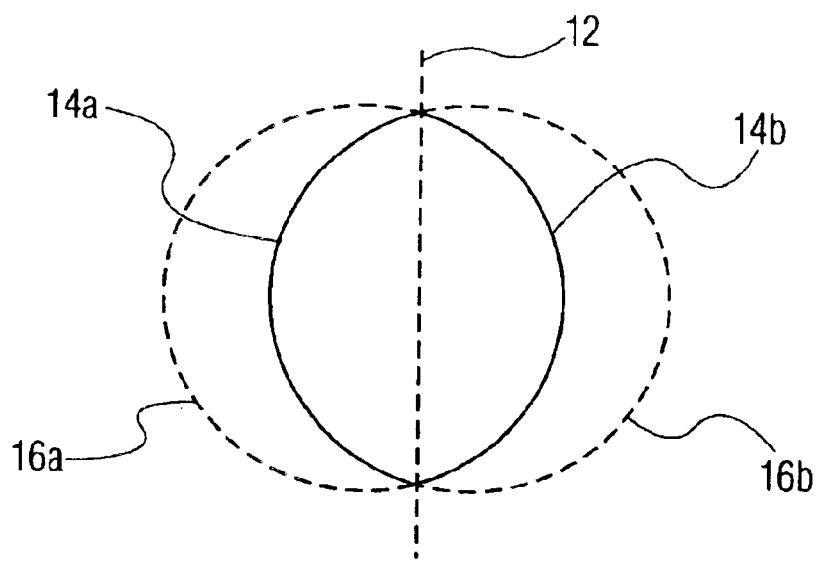
FIG. 1b is a simplified view of the output of a prior art non-imaging collector.

To put the invention in perspective, FIG. 1a shows a circle 10 and axis 12 used for designing the output of the preferred embodiment of the non-imaging collector of prior art U.S. Pat. No. 6,304,693, mentioned above. FIG. 1b shows circular arcs 14a and 14b, i.e., sections of full circles, that form an output shape of the prior art collector. The shape defined by arcs 14a and 14b is an oblong shape.

The remainder of this description concerns the three subjects of light-collection systems with (1) light-collection rods with circular cross section at the output of a light collector, (2) rods with a non-circular cross section at a collector output, and (3) miscellaneous aspects.

1. Rods with Circular Cross Section at Collector Output

Figure 2A:
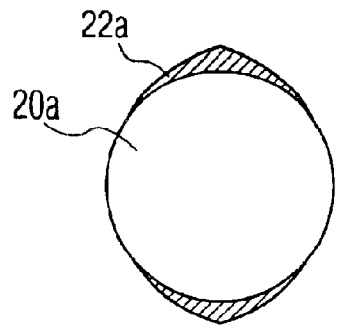
FIGS. 2a–2c show simplified views of the face of a thermally isolating rod overlying the output of respective light collectors, shown as cross hatched for clarity, with FIG. 2a showing the prior art, FIG. 2b showing the arrangement of another invention of the present assignee, Fiberstars Inc., and FIG. 2c showing an arrangement in accordance with the present invention.
Figure 2B:
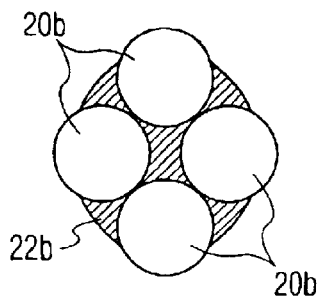
Figure 2C:
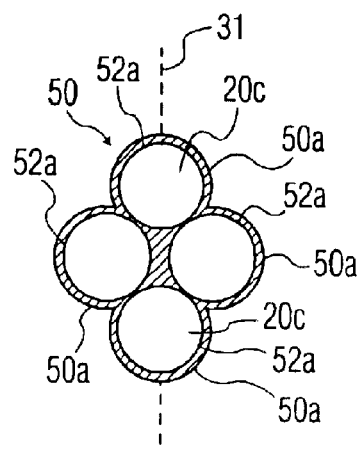

The present invention concerns a way to increase the efficiency of light delivered into a plurality of light pipes through the use of multiple, discrete rods. FIGS. 2a–2c, shown on three sequential drawing sheets, show progressive arrangements of the face of light-collecting rods 20a, 20b and 20c overlying the output of light collectors 22a, 22b and 22c, respectively, which are shown cross hatched for convenience. FIGS. 2a–2c contrast the differences in area of collector outputs covered among various arrangements of light-collecting rods. FIG. 2a shows single collecting rod 20a overlying collector 22a of above-mentioned prior art U.S. Pat. No. 6,304,693; FIG. 2b shows four discrete rods 20b overlying a prior art collector 22b; and FIG. 2c shows, in accordance with the present invention, four discrete rods 20c overlying a light collector 22c shaped to match the four rods. The area of rods 20a–20c in FIGS. 2a–2c is directly related to the amount of light that can be collected by the rods and delivered into light pipes.

Regarding FIGS. 2a–2c, the percentage of the collector's output area covered by the input of the rod or rods is as follows: FIG. 2a, about 90%; FIG. 2b, about 85%; and FIG. 2c, over 95%. The maximum efficiency of the prior art system of FIG. 2a for transferring light from collecting rod to light pipes is limited to 72%. In the prior art system of FIG. 2a, the single rod 20a is used to create an output face with substantially even illumination across the face, which delivers a substantially equal amount of light to each of several light pipes, while providing UV and IR protection on the input face to the rod, and thermally isolating the light pipes from the light source. However, the disadvantage to using a single rod with a bundle of multiple light pipes is that there are light losses from the interstitial voids created when trying to couple multiple round light pipes to a single round rod. This can be appreciated from considering FIGS. 3a and 3b.

Figure 3A:
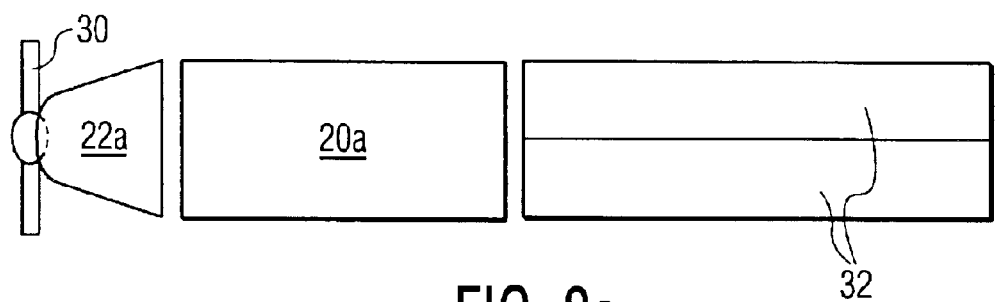
FIG. 3a shows a simplified, side plan view of the prior art illumination system of FIG. 2a, including light source and light pipes.
Figure 3B:
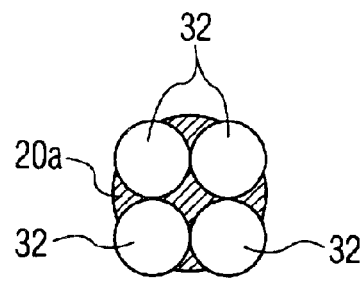
FIG. 3b shows a simplified view of the face of four light pipes overlying the output of a single rod, with the rod shown cross hatched for clarity.

FIGS. 3a–3b show the prior art illumination system associated with FIG. 2a, including a light source 30, hollow light collector 22a, a light-collecting rod 20a of 19 mm diameter, for instance, and four light pipes 32 for receiving light from the single rod 20a. The losses vary as the number and diameter of light pipes 32 increases, but for four 10.3-mm core diameter light pipes, as shown in FIG. 3b, a maximum collection efficiency of 72% is realized, due to the interstices of the light pipes that result in lost light. This results in an overall delivery efficiency of 90%×72%=65% of collected light into the light pipes.

In further regard to FIG. 2b, four 10 mm rods 20b are able to collect about 85% of the light from collector 22b, which is lower than the percentage (i.e., 90) in the case of FIG. 2a showing a single rod 20a collecting light in the prior art system. However, the system of FIG. 2b realizes an increased efficiency over the prior art system of FIG. 2a (or FIGS. 3a–3b), and is shown in connection with FIGS. 4a and 4b.

Figure 4A:
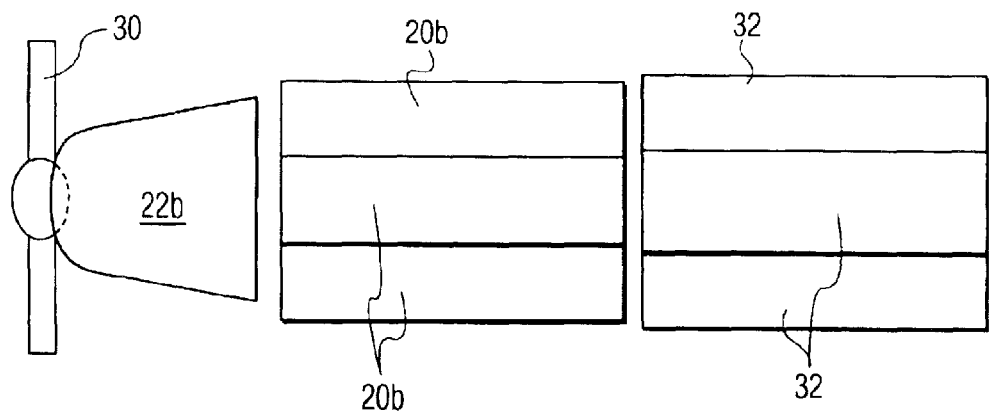
FIGS. 4a and 4b are like FIGS. 3a and 3b, respectively, but show multiple light-collecting rods rather than a single light-collecting rod.
Figure 4B:
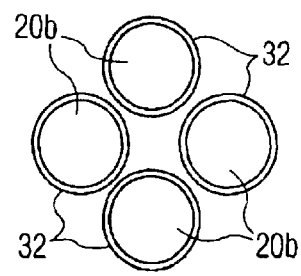

In contrast with the illumination system of FIGS. 3a and 3b, the illumination system of FIGS. 4a and 4b, associated with FIG. 2b, uses a plurality of light-collecting rods 20b, one for each light pipe 32. The illumination system of FIGS. 4a and 4b realizes increased efficiency by eliminating light losses due to interstitial spacing between four light pipes for receiving light from a single round rod (FIG. 3b). Thus, in FIG. 4b, each of the discrete collecting rods 20b delivers light to a single light pipe 32. Sizing of the rods as slightly smaller than the light-carrying section of the light pipe ensures that all light collected by the rods is delivered into the light pipes. In a 4-way system based on the prior art hollow coupler, this results in an overall light-delivery efficiency of 85% because all light collected by the rods from the light collector is delivered into the light pipes. This concept relating to FIG. 2b and FIGS. 4a–4b concerns a separate invention owned by Fiberstars Corporation, the instant assignee.

Figure 5A:
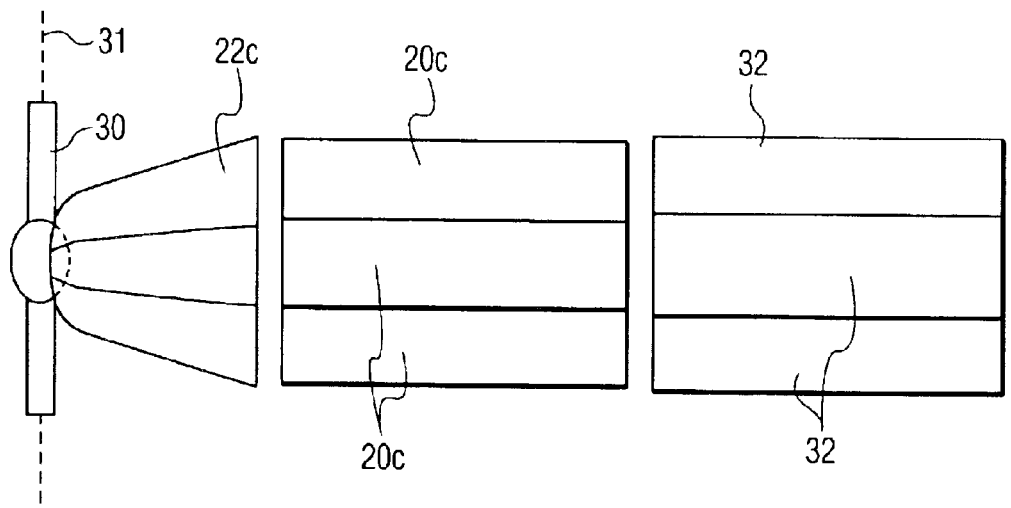
FIGS. 5a and 5b are like FIGS. 3a and 3b, respectively, but show multiple light-collecting rods as well as a collector whose output perimeter is shaped in accordance with the present invention.
Figure 5B:
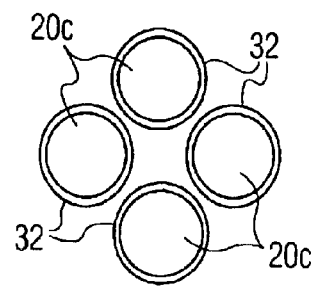

The present invention as shown, for instance, in FIGS. 2c and FIGS. 5a and 5b improves upon the use of multiple, discrete rods and the hollow collector—which collector per se is prior art—of FIG. 2b and FIGS. 4a–4b. Thus, FIG. 2c shows that, by shaping collector 22c to match the outer circumference of a grouped set of rods 20c, more light can be delivered into the rods. More broadly, a perimeter 50 (FIG. 2c) of an outlet of collector 22c has a plurality of shaped portions 50a, each associated with, and each substantially shaped the same as, a substantial portion 52a of an associated perimeter of a respective one of the plurality of rods. In fact, the output perimeter of shaped collector 22c resembles a "cloverleaf" pattern. In a 4-rod configuration as shown in FIG. 2c, the collection of light from the collector can be greater than 95%.

In the arrangement of FIGS. 2c and 5a, the inlet faces of the top- and bottom-shown rods 20c are collectively aligned substantially parallel to a main axis 31 of light source 30. The inlet faces of the left- and right-shown rods 20c (FIG. 2c) are collectively aligned generally orthogonal, and preferably substantially orthogonal, to main axis 31. This is a preferred arrangement of rods 20c.

FIG. 5b shows that, by properly sizing light pipes 32, which are coupled to rods 20c, so that the light-carrying element of each light pipe is equal to or greater in diameter than that of rods 20c, 100% of the light collected by the rods is delivered into the light pipes. Coupled with the greater than 95% collection of light by the rods from the collector, the overall light delivery efficiency to the light pipes is greater than 95%. This is compared to typically 67% for the prior art 4-way light pipe bundle system of FIGS. 2a and 3a–3b, and 85% for the 4-way rod system of FIGS. 2b and 4a–4b.

Figure 5C:
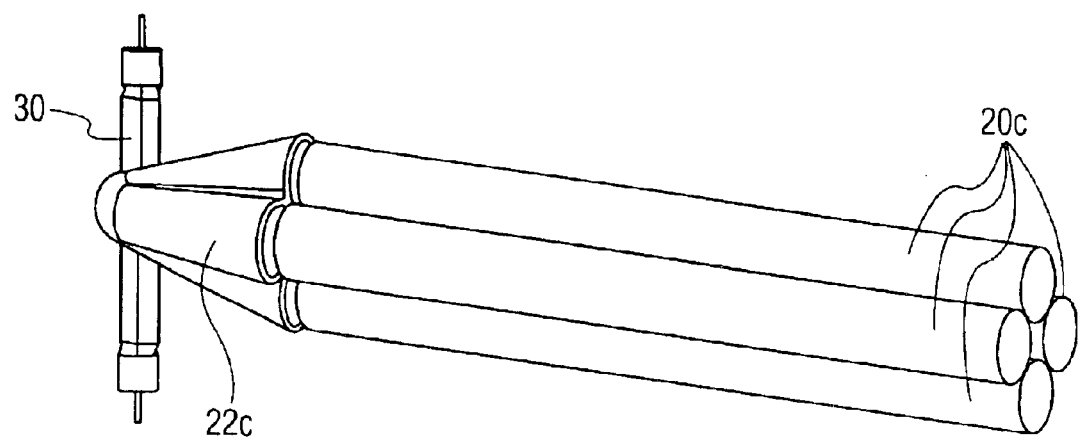
FIGS. 5c and 5d are perspective views of the illumination system of FIG. 5a, in which the light-collection rods are parallel to each other, and not parallel to each other, respectively.
Figure 5D:
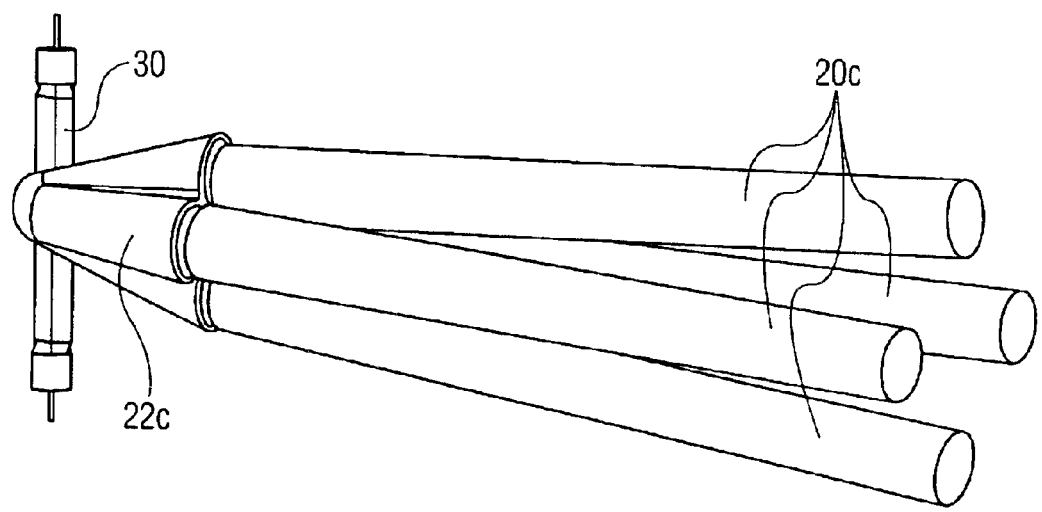

FIG. 5c shows an arrangement of the illumination system of FIG. 5a in which light-collecting rods 20c are parallel to each other. In contrast, FIG. 5d shows an arrangement of the system of FIG. 5a in which the output ends of the light-collecting rods 32 are spaced further apart from each other than their input ends. This allows easier coupling to light pipes (not shown).

Figure 5E:
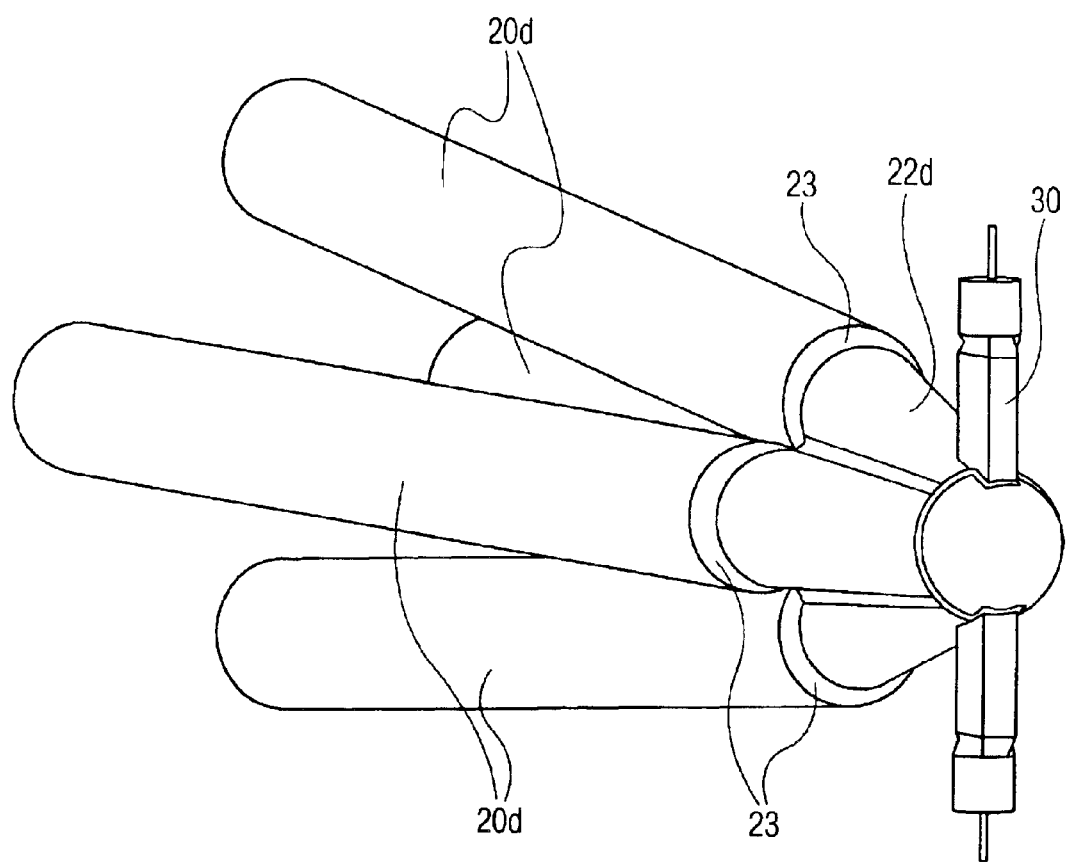
FIG. 5e is similar to FIG. 5d, but shows an illumination system in which the inlet faces of the light-collection rods extend beyond, and substantially fully cover, the perimeter of the outlet of a light collector.

FIG. 5e shows a variation of FIG. 5d, in which inlet faces 23 of light-collection rods 20d exceed the perimeter of the outlet of a light collector 22d. In this variation, rods 20d collect substantially all the light emitted by the collector. In FIG. 5d, in contrast, inlet faces of rods 20c are substantially fully subsumed by an outlet face of collector 22c.

Preferably, the light collectors described herein, such as collector 22c in FIGS. 2c and 5a–5b, substantially conforms to non-imaging optics, and may contain contours formed from one or many compound parabolic concentrators ("CPC's). A CPC shape is described in detail in, for instance, W. T. Welford and R. Winston, High Collection Nonimaging Optics, New York: Academic Press, Inc. (1989), chapter 4 (pp. 53–76). The collectors convert light in a small area at a high angle into a larger output area at a lower angle. When changing from previous designs to the "cloverleaf"-shape collector outputs described herein, the large output area of the collectors is maintained to achieve the proper light-output angles. Because the angular distribution of light is determined by the numerical aperture of the light pipe, both types of optical couplers (i.e., of FIGS. 4a–4b or FIGS. 5a–5b) must provide for the same angular distribution of light. Since both optical couplers may use the same input source and output angular distribution, the areas of both couplers are limited to a minimum determined by the conservation of Etendue.

The present inventive concept of shaping the collector to match the rods—as more precisely defined above—is not limited to just a 4-rod system. The concepts for system using 2, 3, and 5 rods are shown in FIGS. 6a–6c, respectively, but the general inventive concept could be applied to systems using more than 5 rods.

Figure 6A:
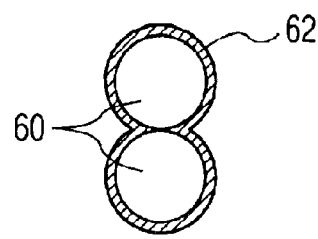
FIGS. 6a–6c are like FIG. 2c, but show different numbers of light-collecting rods and differently shaped light collectors.
Figure 6B:
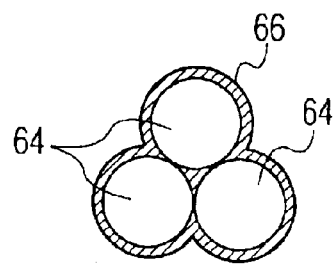
Figure 6C:
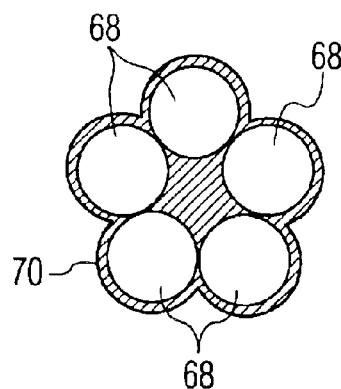

Each of the rods in FIGS. 6a–6c is shown tangent to, or abutting, an adjacent rod. Thus, in FIG. 6a, rods 60 abut each other, and collector 62 is shaped accordingly. Similarly, in FIG. 6b, adjacent ones of rods 64 abut each other, and collector 66 is shaped accordingly. Similarly, in FIG. 6c, adjacent ones of rods 68 abut each other, and collector 70 is shaped accordingly. However, the abutting relationship of the rods in FIGS. 6a–6b may not be the optimum configuration to produce substantially the same illumination in each rod.

For example, FIG. 2c described above shows a 4-rod configuration, with the two side rods closer together than the top and bottom rods. A system using an oblong light source, where each of the four rods is tangent to (or abutting) only two other rods is likely to collect more total light, but such light is not distributed substantially evenly to all four rods. The top and bottom rods receive more light than the side rods because of imperfect light density distribution at the collector output. To compensate for this, the side rods are brought closer together and the top and bottom rods are moved further apart until each of the four rods receive the most balanced amount of light. This imbalance in the tangent (or abutting) configuration is due to the oblong shape of the light source used. A different source with a different shape would yield a different optimum configuration of the rods. This would result in a differently shaped collector to achieve a substantially even distribution of light to all rods.

In the prior art system of FIGS. 2a and 3a–3b, for instance, the shape of the light collector is formed by joining sections from two circles together, as in FIG. 1b. The shape of the collector's output could simply match the outside circumference of the light-collection rods used or, to achieve optimum performance, would be a series of joined sections of a circle (i.e., circular arcs). The so-shaped shaped collector includes as many arcs of as many circles needed to produce the desired shape. Shaping of the collector with such circular arcs results in the light-collecting rods efficiently collecting light from the collector. The size and orientation of the arcs used would depend on the number of collection rods used and the shape of their inputs faces. Some examples of this are shown in FIGS. 7a and 7b.

Figure 7A:
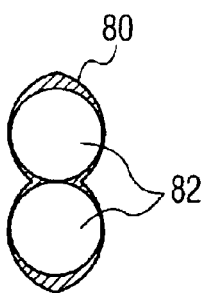
FIGS. 7a and 7b are like FIG. 2c, but show different numbers of light-collecting rods and differently shaped light collectors.
Figure 7B:
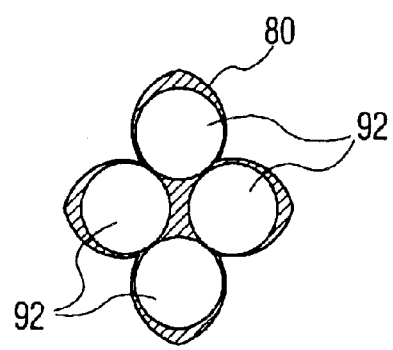

FIGS. 7a and 7b show how the concept of shaping the prior art collector of FIG. 2a (or FIG. 1b), which comprises two arcs from a circle joined together, can be used in a novel manner to form a shaped collector with improved coupling to multiple, discrete rods. The new shaped collector 80, associated with rods 82, (FIG. 7a) or the new shaped collector 90 (FIG. 7b), associated with rods 92, essentially comprises several arcs of a circle joined together. This is one shape, in accordance with the invention—that is, several circular arcs joined together—, which allows for efficient collection of light by multiple, discrete light-collection rods.

Figure 8A:
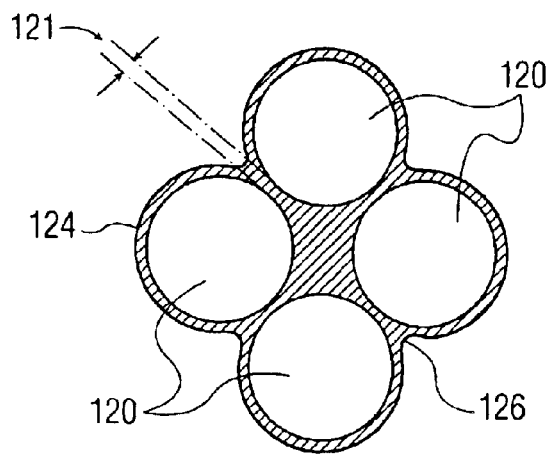
FIGS. 8a–8c are similar to FIG. 2c, but show different arrangements of rods and collectors.
Figure 8B:
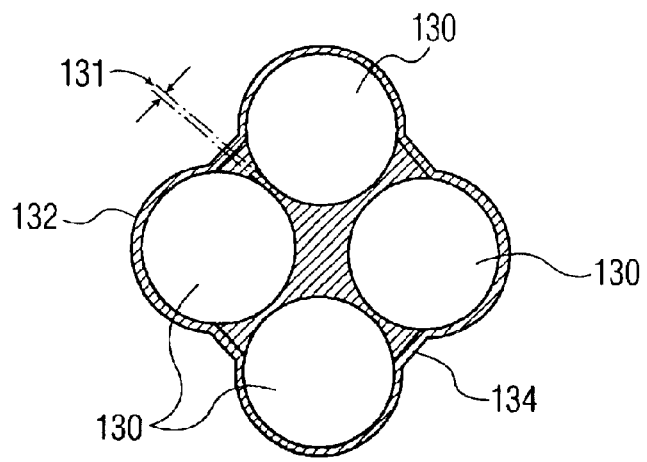
Figure 8C:
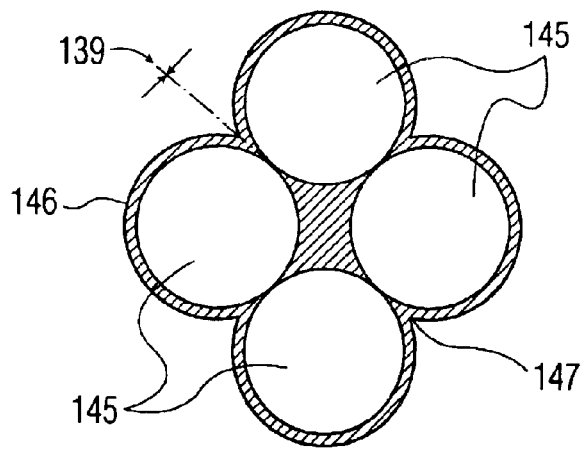

FIGS. 8a–8c show other designs of fiberoptic lighting systems with various spacings, or no spacing, between rods at the collector output. It is preferred to have the input faces of the rods tangent to (or abutting) each other at the output plane of the optical coupler. This idealized design is shown in FIG. 8c, in which the rods are "spaced" from each other by a zero distance 139, but manufacturing tolerances may make this embodiment relatively difficult to make. An alternate construction, shown in FIGS. 8a and 8b, for instance, is with the input faces of the rods close to, but slightly spaced from, each other, usually within about 2 mm. This helps to prevent breakage of the rods during construction or operation.

FIG. 8a shows rods 120 spaced from each other by dimension 121, and output of collector 124 conforming to the shape of the rods according to the shaping principles described herein. Similarly, FIG. 8b shows rods 130 spaced from each other by dimension 131, and output of collector 132 conforming to the shaping principles described herein. FIG. 8b differs from FIG. 8a in that collector 132 (FIG. 8b) includes flat sections 134, as opposed to the rounded sections 126 of collector 124 (FIG. 8a). In FIG. 8b, flattened sections 134 result in a somewhat less efficient construction that in FIGS. 8a and 8c, but manufacturing may be easier.

The foregoing arrangements of FIGS. 8a and 8b, in which the rods are spaced from each other, can be optimized by either increasing the size of the arcs that define the perimeter of the outlet region of the coupler or by increasing the number of arcs as compared to the coupler design of FIG. 8c, in which the rods are held tangent.

In FIG. 8a, the rounded sections 126 of collector 124 can be shaped substantially as arcs. Thus, in the design shown in FIG. 8a, the spaced rod inputs are accommodated by increasing the number of arcs in the coupler output. Shaped collectors with rounded sections 126 of FIG. 8a may be somewhat less efficient than the idealized design in FIG. 8c, but are more efficient than the design in FIG. 8b and easier to manufacture than the idealized design in FIG. 8c.

The idealized design in FIG. 8c shows rods 145 touching or in very close proximity (i.e., under about ½ mm from each other). The output of collector 146 conforms to the shape of the rods according to the shaping principles described herein. FIG. 8c differs from FIGS. 8a and 8b because the interface 147 between arcs defining is shown as a cusp. This is the most efficient construction, but in practice somewhat difficult to produce.

2. Rods with Non-Circular Cross Section at Collector Output

The following figures relate to light-collection systems including light-collecting rods with non-circular cross sections at the output of a light collector.

Figure 9A:
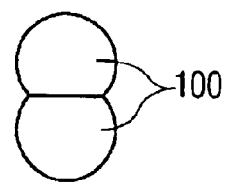
FIGS. 9a–9c are simplified views of the input faces of rods for collecting light from different light-collectors shaped according to the present invention.
Figure 9B:
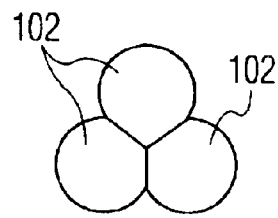
Figure 9C:
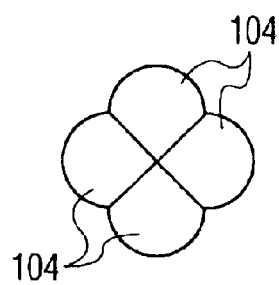

FIGS. 9a–9c show inlet faces of rods that can be associated with a shaped collector as described herein. FIG. 9a shows two rods 100, FIG. 9b shows three rods 102, and FIG. 9c shows four rods 104. The output face of each rod preferably has a generally circular cross section. This requires a change in shape of the rods, from input face to output face.

Figure 10A:
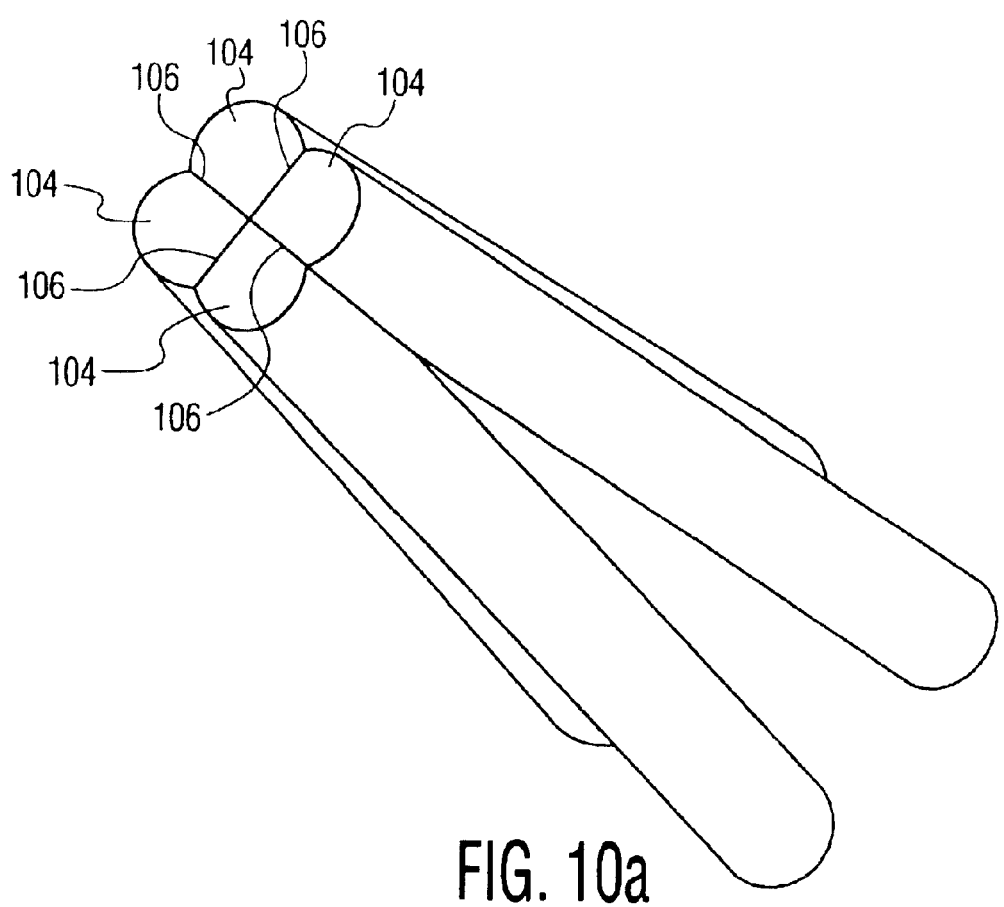
FIG. 10a is a perspective view of the full length of the rods of FIG. 9c.
Figure 10B:
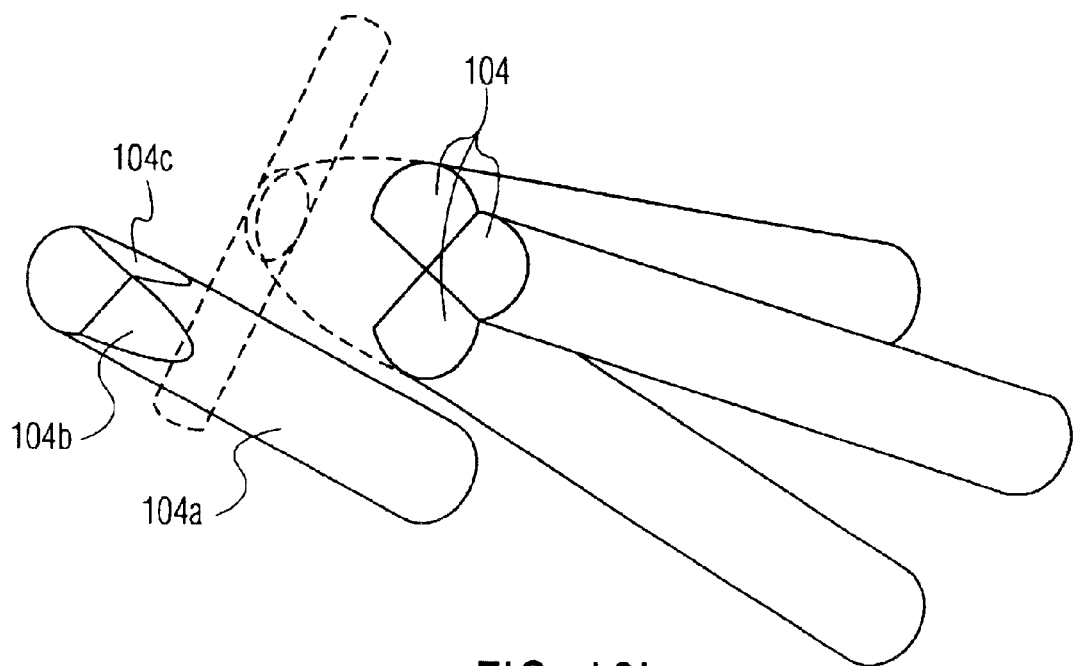
FIG. 10b is similar to FIG. 10a but shows one rod displaced from the other for clarity of illustration.
Figure 10C:
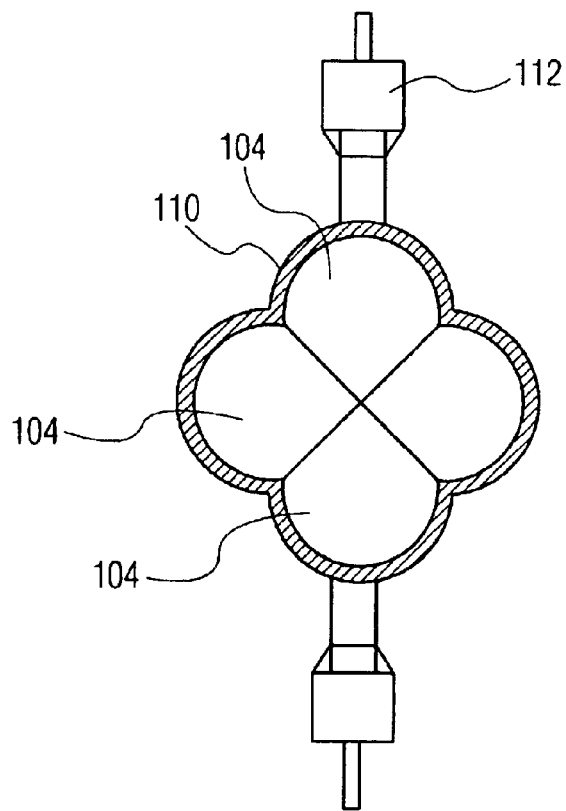
FIG. 10c shows the positioning of the input faces of the rods of FIG. 9c (or of FIG. 10a), with a collector shaped in accordance with the invention and a light source.

With further reference to FIGS. 10a–10c, the rod input faces are non-circular but the rod output faces (not shown) are normally of another—e.g., circular—shape. For instance, FIG. 10a shows the entire length of rods 104 of FIG. 9c, with FIG. 10b showing a rod 104a displaced from the other three rods 104 so as to better portray the shaping of the rods. Rods 104 can be produced by removing two angled slices (e.g., 104b and 104c) from each of the four rods. Then, the rods could be positioned together as shown in FIG. 10a, with substantially no spacing at interstices 106 of the rods.

In FIGS. 10a–10c, the non-circular rod input faces 104 could have the same areas as the areas of the circular output faces (not shown) of the rods.

FIG. 10c shows how a collector 110 for a light source 112 could be shaped to conform to the collection of rods 104, in accordance with the present inventive principles However, shaping of rods 104 (FIG. 10a) would also improve efficiency with the prior art collector of FIG. 2a.

As shown in FIG. 10a, by eliminating the interstitial spaces between the rods at 106, the perimeter or border of the rod input faces is completely defined by the projection of the rod input faces onto the collector output plane. By using a collector shaped according to the principles described herein, the light-collection rods would collect 100% of the light emitted by the collector.

It is also possible for the rods to undergo a more drastic change of shape, from an input with a generally square cross-section to an output with a generally circular cross-section, to facilitate the collection of light emitted by the collector and the delivery of light into the light pipe. The shape of the CPC would change accordingly. This would also eliminate the interstitial space with border completely defined by the projection of the rod input faces onto the collector output plane.

Figure 11:
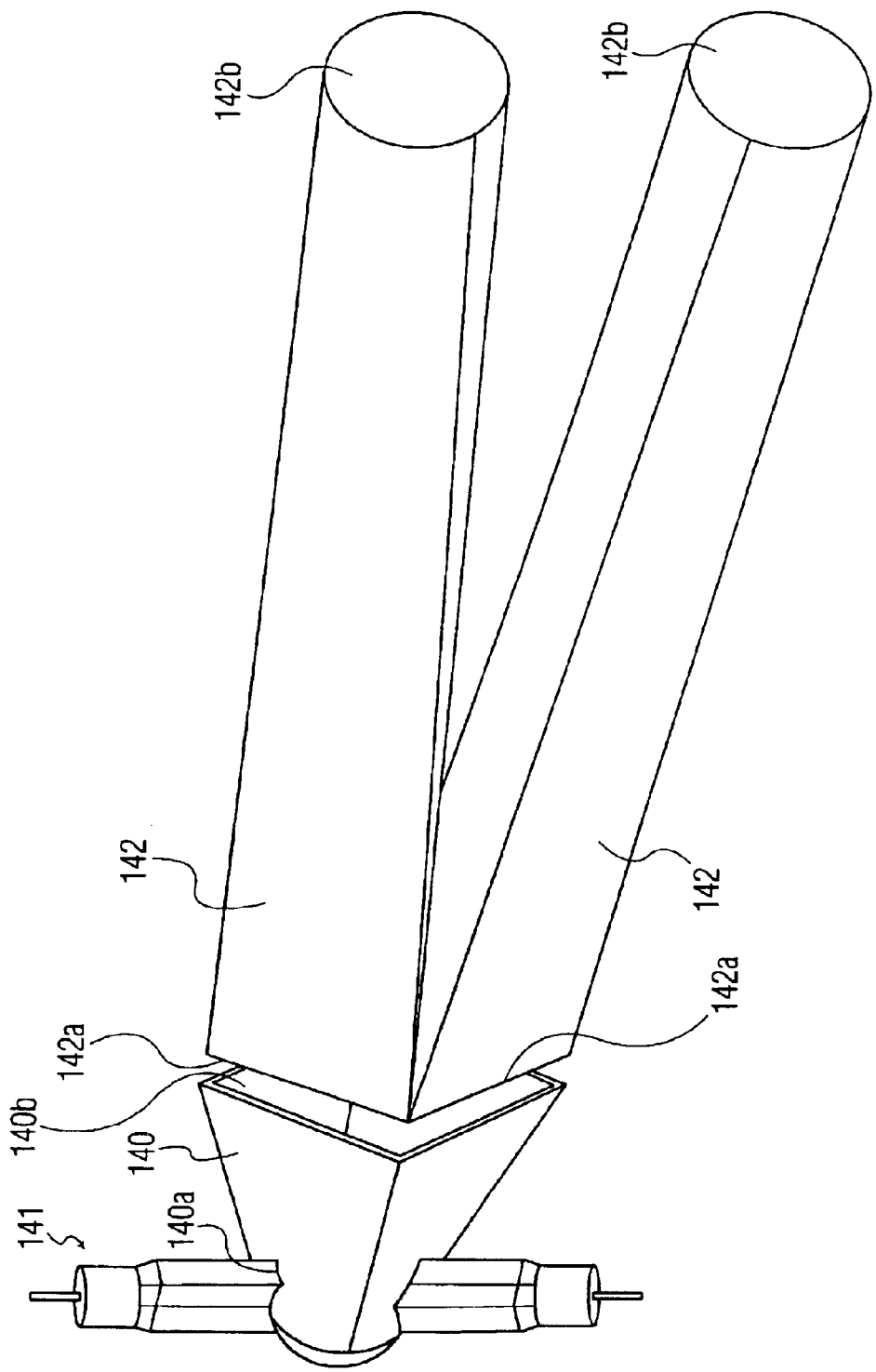
FIG. 11 is a perspective view of an illumination system in which light-collecting rods have a triangular input face and circular output face.

Thus, FIG. 11 shows a light collector 140 receiving light at an inlet 140a from a light source 141, and transmitting light through a square outlet 140b to a pair of rods 142. Inlet ends 142a of the rods have the shape of an equilateral triangle. Outlet ends 142b are circular in shape. Thus, the rods change shape from inlet to outlet, as shown.

Figure 12:
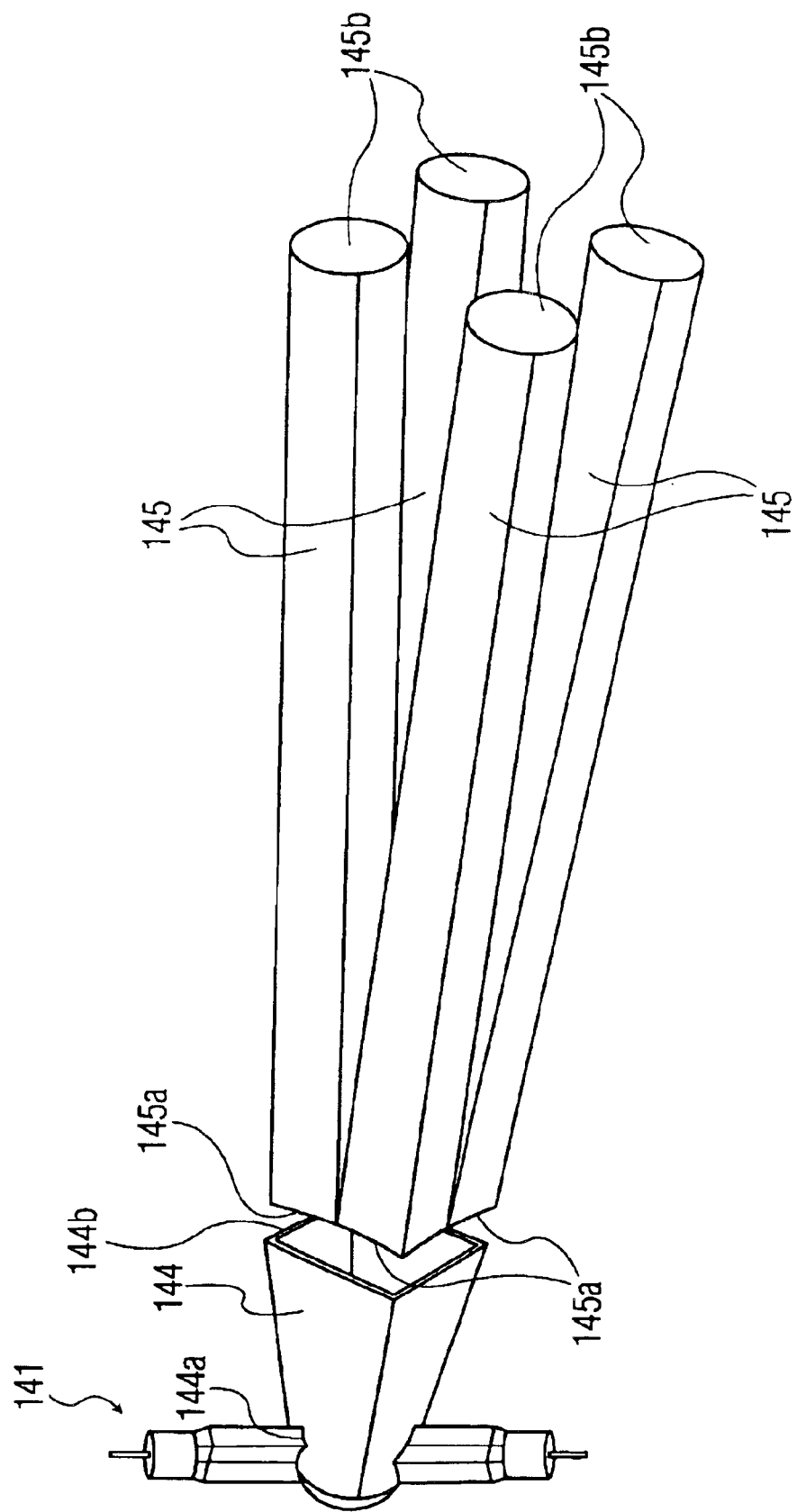
FIG. 12 is a perspective view of an illumination system in which light-collecting rods have a square input face and circular output face.

FIG. 12 shows a collector 144 receiving light at an inlet 144a, and transmitting ligth through a square outlet 144b to four rods. Inlet ends 145a of the rods are square in shape. Outlet ends 145b are circular in shape. Thus, the rods change shape from inlet to outlet, as shown.

3. Miscellaneous

The following description refers to principles and variations that apply to any illumination systems according to the invention.

Figure 13A:
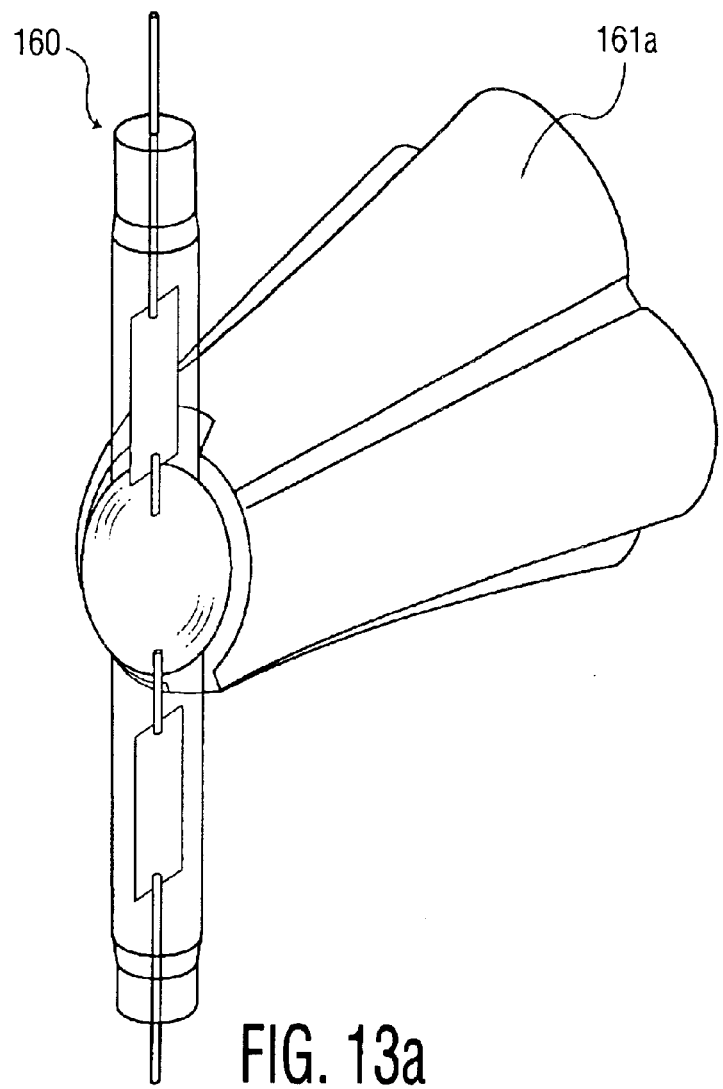
FIGS. 13a and 13b are perspective views of metal halide and halogen lamps, respectively, that may be used in the inventive illumination system.
Figure 13B:
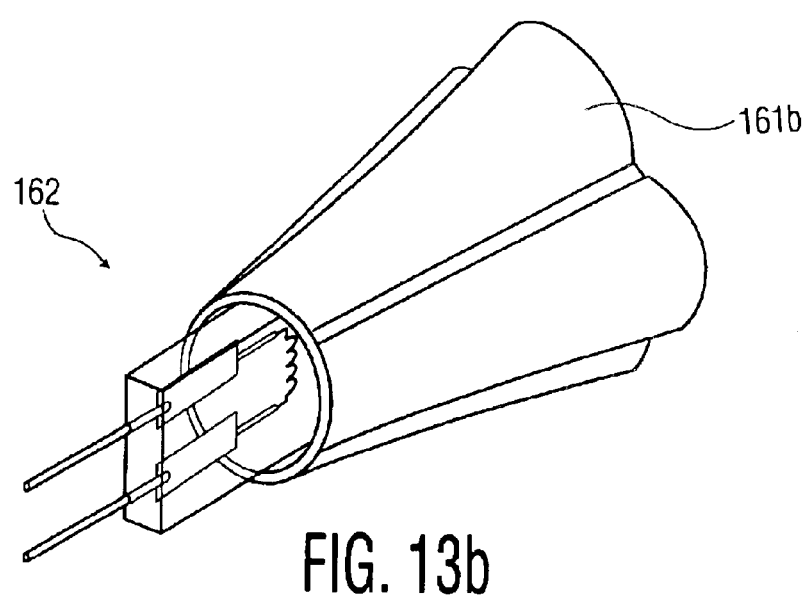

FIG. 13a shows a typical metal halide arc discharge lamp 160 received in a collector 161a shaped according the invention, and FIG. 13b shows a quartz halogen, filamented lamp 162 received in a shaped collector 161b according to the invention.

Figure 14:
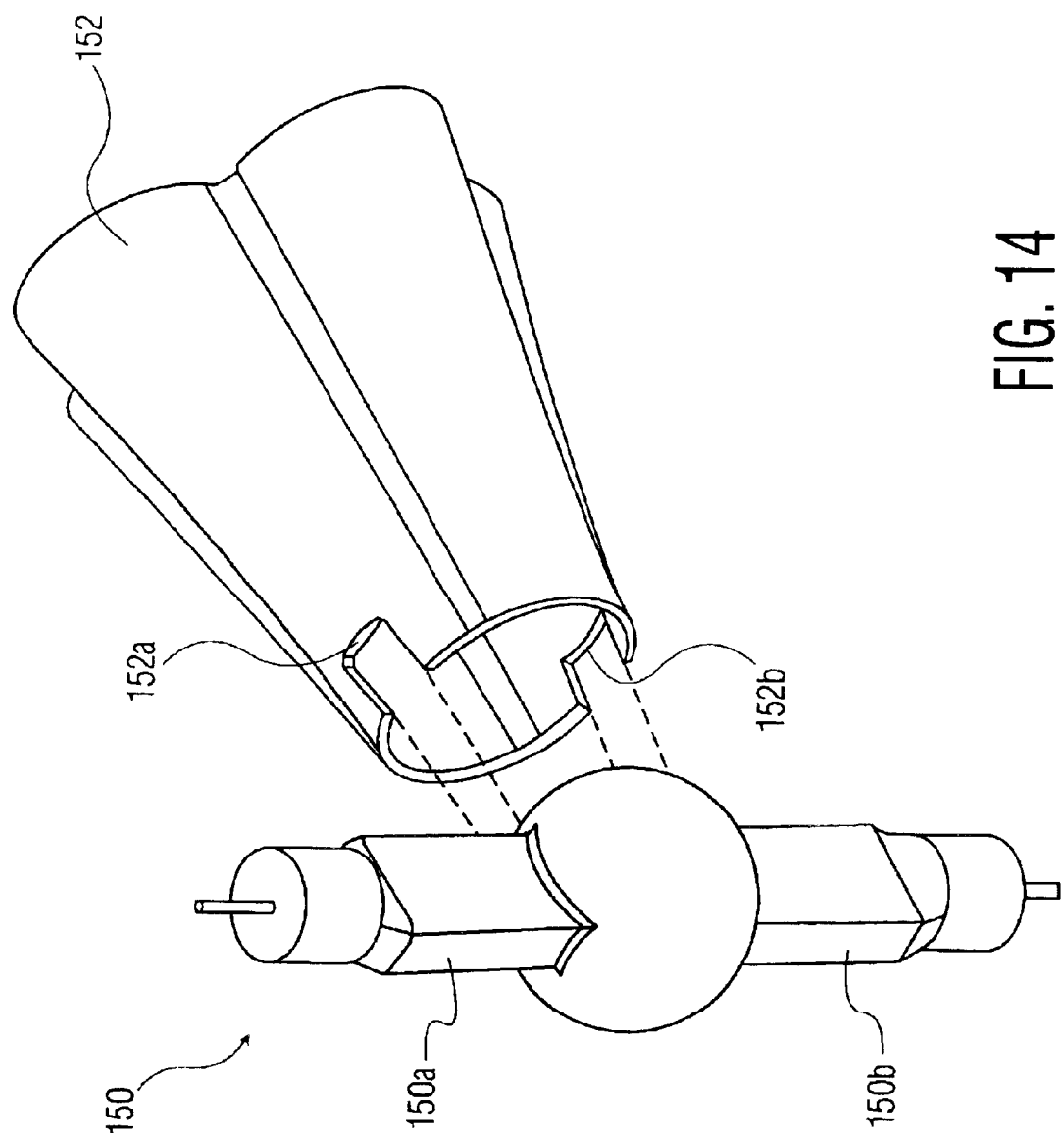
FIG. 14 is an exploded, perspective view of a light source and a shaped light collector.

FIG. 14 shows a lamp 150 having input arms 150a and 150b for being received within notches 152a and 152b, respectively, of a shaped collector 152. The concept of notches per se in a non-imaging light collector is prior art according to U.S. Pat. No. 6,304,693 mentioned above.

Figure 15A:
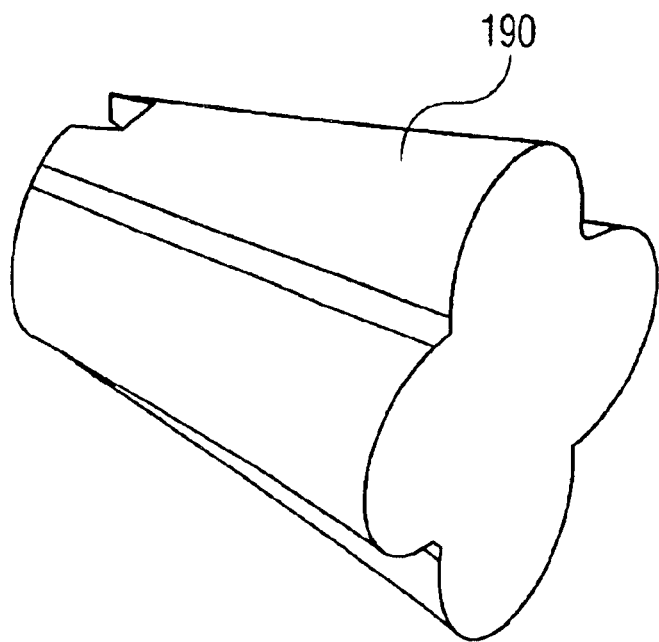
FIGS. 15a and 15b are perspective views of a solid collector shaped according to the present invention.
Figure 15B:
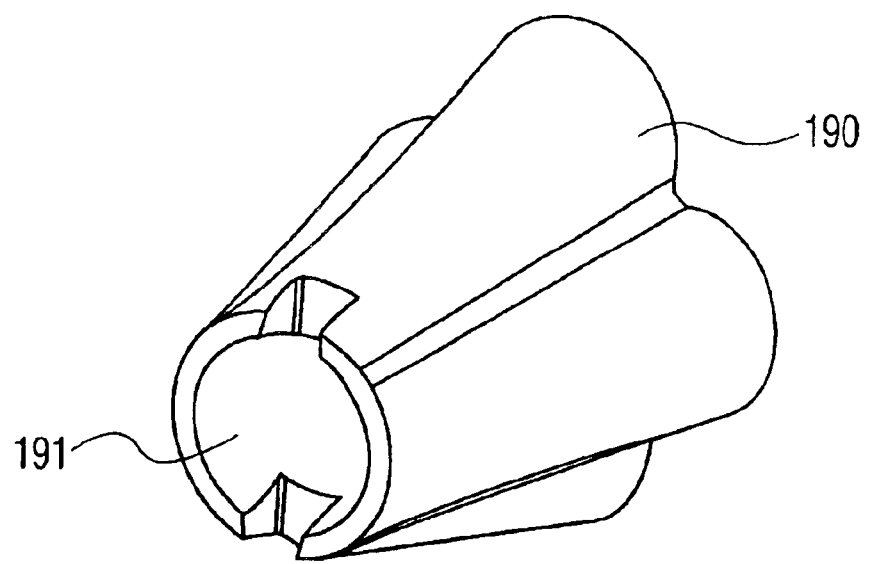

FIGS. 15a and 15b show another version of a light collector 190 according to the present invention. FIG. 15b shows a recess 191 in the collector for receiving a bulbous section of a light source. Collector 190 is solid and can be made of quartz or borosilicate glass, for instance. A solid, or mostly solid, collector may replace any of the hollow collectors described herein.

FIG. 16a shows a configuration of rods and light pipes wherein the output area of rods 200 and 202 exceeds, and subsumes, the input area of light-carrying sections 201 and 203 of the light pipes. As a result, only a majority of the light emitted by each rod is coupled into the light-carrying section of the light pipes.

FIG. 16b shows a configuration of rods and light pipes wherein the output area of rods 206 and 208 is the same or less than, and is subsumed by, the input area of associated light-carrying sections 207 and 208 of the light pipes. As a result, all of the light emitted by each splitter rod is coupled into the light carrying section of the light pipes.

FIG. 17 shows a light-carrying rod 210 with optical coatings 212 and 214. Coating 212 may comprise an infrared (IR) light filter, an ultraviolet (UV) energy filter, or both. However, coating 214 may also comprise the same options as for coating 212, but would normally not be redundant of coating 212. Coating 212 may also increase the amount of light transmitted into rod 210 above the amount the amount that would be transmitted into the rod if the coating were not present. Coating 214 may also increase the amount of light transmitted from rod 210 above the amount that would be transmitted into the rod if the coating were not present.

In any of the illumination systems described herein, the light collectors might not achieve the full reduction in angle of light desirable for transmitting into light pipes (not shown). In this event, the area of each respective rod output face could be increased relative to the area of the respective rod's inlet face. FIG. 18 shows this concept in the form of a bar chart 220, measuring area on axis 220. Chart 220 compares input area 222 of a rod with output area 224 of the rod. As indicated in the chart, output area 224 exceeds input area 222. As a result, the respective rod would serve to further decrease the angle of light it transmits to a lower angle. Such lower angle preferably is suitable for transmitting into light pipes.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A fiberoptic lighting system, comprising:
   a) a light source with a bulbous section;
   b) a plurality of plastic light pipes having substantially circular cross sections;
   c) a collector having an inlet for receiving light from the light source and an outlet; the collector performing an area-to-angle conversion on light it collects from the light source; and
   d) a plurality of rods for receiving light from the collector and passing such light to the plastic light pipes, while thermally isolating the plastic light pipes from the light source;
   e) a perimeter of an outlet of the collector having a plurality of shaped portions, each associated with, and each substantially shaped the same as, a substantial portion of an associated perimeter of a respective one of the plurality of rods.

2. The system of claim 1, wherein the number of rods and the number of light pipes are the same as each other.

3. The system of claim 1, wherein the light pipes have substantially the same cross sections as each other.

4. The system of claim 1, wherein the rods have substantially the same cross sections as each other.

5. The system of claim 1, wherein the rods are arranged with adjacent rods within about 2 mm of each other.

6. The system of claim 1, the rods are arranged with substantially no interstitial spacing at their input ends.

7. The system of claim 1, wherein, ignoring any spacing between the rods, a cross sectional, collective rod perimeter of the plurality of rods is substantially the same as the perimeter of the output of the collector.

8. The system of claim 1, wherein:
   a) the rods have a circular cross section in the vicinity of the collector; and
   b) the perimeter of the collector defines a series of circular arcs arranged in convex fashion with respect to a longitudinal axis of the collector, adjacent arcs adjoining each other or being spaced from each other by less than about 25% of the radius of the arcs.

9. The arrangement of claim 1, wherein the outlet area of each respective rod exceeds the inlet area of the respective rod, so that the rod reduces the angular distribution of light it transmits.

10. The system of claim 8, wherein:
    a) the light source is oblong along a main axis;
    b) the number of rods is four;
    c) a first pair of inlet faces of the rods is collectively aligned substantially parallel to the main axis;
    d) a second pair of inlet faces of the rods is collectively aligned generally orthogonal to the main axis; and
    e) the first pair of rods being spaced further apart from each other than the second pair of rods is spaced from each other.

11. The system of claim 10, wherein the second pair of inlet faces of the rods is aligned substantially orthogonal to the main axis.

12. The system of claim 1, wherein the rods have a non-circular cross section at inlets for receiving light from the collector.

13. The system of claim 1, wherein the rods have a substantially circular cross-section along their entire length.

14. The system of claim 1, wherein the rods undergo a change of cross-sectional along their longitudinal axes from non-circular at their inputs to substantially circular at their outputs.

15. The arrangement of claim 14, wherein the rods are tilted with respect to each other as they come together at an output of the collector.

16. The arrangement of claim 1, wherein the rods do not undergo a change of shape and have a cross-section at the output the same as at the input.

17. The arrangement of claim 1, wherein the rods have a generally rectangular cross section along at least a portion of the length of the rods.

18. The arrangement of claim 17, wherein the outlet area of each respective rod exceeds the inlet area of the respective rod, so that the rod reduces the angular distribution of light it transmits.

19. The arrangement of claim 1, wherein the rods have generally triangular cross-section along at least a portion of the length of the rods.

20. The arrangement of claim 19, wherein the outlet area of each respective rod exceeds the inlet area of the respective rod, so that the rod reduces the angular distribution of light it transmits.

21. The system of claim 1, wherein the collector is made of borosilicate glass or UV-absorbing glass.

22. The system of claim 1, wherein the collector is made of quartz.

23. The system of claim 22, wherein the collector is substantially entirely a solid piece of quartz.

24. The system of claim 1, wherein the collector is a substantially solid piece of borosilicate glass or UV-absorbing glass.

25. The system of claim 1, wherein the rods are made of borosilicate glass or UV-absorbing glass.

26. The system of claim 1, wherein the rods are made of quartz.

27. The arrangement of claim 1, wherein the rods are parallel to each other.

28. The arrangement of claim 1, wherein at least one rod has its output face located farther from the collector optical axis than the input face.

29. The arrangement of claim 1, wherein the rods are tilted with respect to each other as they come together at an output of the collector.

30. The system of claim 1, wherein the rods and light pipes are constructed and arranged with respect to each other so that the output area of the rods exceeds, and subsumes, the input area of the light-carrying sections of the light pipes.

31. The system of claim 1, wherein the rods and light pipes are constructed and arranged with respect to each other so that the output area of the rods is the same or less than, and is subsumed by, the input area of the associated light-carrying sections of the light pipes.

32. The system of claim 1, wherein inlet faces of the rods extend beyond, and substantially fully cover, the perimeter of the outlet of a light collector.

33. The system of claim 1, wherein the light source is a metal halide lamp.

34. The system of claim 1, wherein the light source is a halogen lamp.

35. An illumination system, comprising:
    a) a metal halide light source with a bulbous section and a pair of electrical input ends;
    b) a plurality of plastic light pipes having substantially the same cross sections as each other; the cross sections being substantially circular in shape;

c) a collector having an inlet for receiving light from the light source and an outlet; the collector performing an area-to-angle conversion on light it collects from the light source; the collector being hollow and containing a pair of notches for respectively receiving the input ends of the light source;

d) a plurality of rods, associated respectively with the plurality of light pipes, for receiving light from the collector and passing such light to the plastic light pipes, while thermally isolating the plastic light pipes from the light source; the rods having substantially the same cross sections as each other; and e) a perimeter of an outlet of the collector having a plurality of shaped portions, each associated with, and each substantially shaped the same as, a substantial portion of an associated perimeter of a respective one of the plurality of rods.

36. The system of claim 35, wherein the rods have a circular cross section at an outlet of the collector.

37. The system of claim 35, wherein at least one end of at least one rod is coated with material that filters infrared and ultraviolet light.

38. The system of claim 37, wherein one end of at least one rod is coated such that more light enters the rod then would normally enter without the coating.

39. The system of claim 35, wherein the ends of the light pipes receiving light from the rods cover the entire output ends of the rods.

40. The arrangement of claim 35, wherein the outlet area of each respective rod exceeds the inlet area of the respective rod, so that the rod reduces the angular distribution of light it transmits.

41. The system of claim 35, wherein, ignoring any spacing between the rods, a cross sectional, collective rod perimeter of the plurality of rods is substantially the same as the perimeter of the output of the collector.

* * * * *

UNITED STATES PATENT AND TRADEMARK OFFICE
CERTIFICATE OF CORRECTION

PATENT NO.       : 6,942,373 B2                                           Page 1 of 1
APPLICATION NO.  : 10/794624
DATED            : September 13, 2005
INVENTOR(S)      : Buelow, II et al.

It is certified that error appears in the above-identified patent and that said Letters Patent is hereby corrected as shown below:

Column 1, after line 5 insert:

GOVERNMENT INTEREST

This invention was made with Government support under Agreement Number DAAH01-03-9-R001 awarded by the U.S. Army Aviation and Missile Command. The Government has certain rights in the invention.

Signed and Sealed this

Nineteenth Day of August, 2008

JON W. DUDAS
*Director of the United States Patent and Trademark Office*